United States Patent [19]
Nikutta et al.

[11] Patent Number: 5,456,827
[45] Date of Patent: Oct. 10, 1995

[54] COMPRESSOR SYSTEM HAVING A DEVICE FOR CONTINUOUS CLEANING OF THE AUXILIARY OR WORKING LIQUID

[75] Inventors: Karl-Heinz Nikutta; Dietmar Gosch, both of Itzehoe; Erwin Zimmermann, Heiligenstedten; Klaus Ohlrogge, Geesthacht; Jan Wind, Lauenburg; Klaus-Viktor Peinemann, Geesthacht, all of Germany

[73] Assignees: SIHI GmbH & Co KG, Itzehoe; GKSS-Forschungszentrum Geesthacht GmbH, Geesthacht, both of Germany

[21] Appl. No.: 157,068

[22] Filed: Dec. 3, 1993

[30] Foreign Application Priority Data

Jun. 7, 1991 [DE] Germany ............ 41 18 787.3

[51] Int. Cl.⁶ .................................. B01D 61/36
[52] U.S. Cl. ................ 210/167; 210/180; 210/181; 210/182; 210/195.2; 210/188; 417/68
[58] Field of Search ............ 203/39; 210/640, 210/167, 171, 180, 181, 182, 195.2, 188; 417/68, 69

[56] References Cited

U.S. PATENT DOCUMENTS

| | | | |
|---|---|---|---|
| 4,087,208 | 5/1978 | Uda et al. ........................ | 417/68 |
| 4,257,749 | 3/1981 | Ramm ........................ | 417/68 |
| 4,260,335 | 4/1981 | Marchal ........................ | 417/68 |
| 4,719,016 | 1/1988 | Storkebaum et al. ........... | 210/640 |
| 4,978,454 | 12/1990 | Sweet ........................ | 210/640 |
| 5,051,188 | 9/1991 | Spiske et al. .................. | 210/640 |
| 5,147,550 | 9/1992 | Wijmans et al. ............... | 210/640 |

FOREIGN PATENT DOCUMENTS

| | | |
|---|---|---|
| 0007528 | 6/1980 | European Pat. Off. . |
| 0216181 | 1/1987 | European Pat. Off. . |
| 2511334 | 9/1976 | Germany . |
| WO91/08825 | 6/1991 | WIPO . |

*Primary Examiner*—Peter A. Hruskoci
*Attorney, Agent, or Firm*—Chilton. Alix & Van Kirk

[57] ABSTRACT

The auxiliary or working liquid is cleaned by being urged through a pervaporation membrane module (3), then the permeate stream from the membrane module is led through a condenser (4), where the impurities concentrated in the permeate stream precipitate. The stream of retentate and the stream of permeate from the membrane module are then fed back to a compressor (1). The differential pressure of the compressor belonging to the compressor system is used to operate this circuit.

4 Claims, 2 Drawing Sheets

COMPRESSOR SYSTEM HAVING A DEVICE FOR CONTINUOUS CLEANING OF THE AUXILIARY OR WORKING LIQUID

The invention relates to a compressor system having a device for continuous cleaning of the auxiliary or working liquid.

BACKGROUND OF THE INVENTION

Many processes are carried out with the aid of compressors, these compressors frequently being of the type operating with a liquid as an auxiliary or working liquid. As the various gases are extracted or compressed, it is often the case that portions of these gases, e.g. owing to condensation, enter the auxiliary or working liquid of the compressor as undesirable impurities. Firstly, they may be environmentally harmful, i.e. they cannot simply be discharged with the working liquid of the pump. Moreover, they may also have physical and chemical properties which have such an adverse effect on the auxiliary or working liquid (vapor pressure/corrosion), that, when this liquid is fed back and reused in the compressor, reliable operation cannot be ensured. This may result, e.g., in the condensed proportions incorporated in the working liquid outgassing in the compressor, when the auxiliary or working liquid is fed back to the latter, and thus effecting a considerable reduction in the compressor capacity. It is known (EP-A-0 007 528) to clean such liquids by atomizing and heating at low pressure and by condensation. The effort involved is considerable and, in the case of large compressor processes, can undoubtedly be justified economically. In the case of relatively small systems, the effort, however, is disproportionately large. The object of the invention is to provide in this case an efficient, yet cost-effective option for cleaning the liquid.

SUMMARY OF THE INVENTION

The object is achieved according to the invention by the auxiliary or working liquid, after having been precipitated/separated from the gas stream in a separator, being forced through a pervaporation membrane module by means of the compressor, the retentate side of the membrane module being connected to the auxiliary or working liquid inlet, and the permeate side of the membrane module being connected to the suction side of the same compressor with the interposition of a condenser.

In this arrangement, the differential pressure of the compressor belonging to the compressor system is employed to force the auxiliary or working liquid through the membrane module and to feed the cleaned liquid from the retentate side directly to the working-liquid connection of the compressor. In addition, the differential pressure in this arrangement is used to feed back the permeate emerging from the membrane module to the suction side of the same compressor via a condenser. In this case, the permeate leaving the membrane module is enriched with the undesirable impurities, by far the greater part of which impurities is condensed in the downstream condenser with correspondingly high efficiency and can be discharged selectively.

In the system according to the invention, a small fraction of the compressor capacity is thus employed to operate the pervaporation membrane module. This fraction may be—depending on the impurity concentration and the type of the membrane module—5–20%, for example.

The auxiliary or working liquids for compressors of this type heat up during the operation of the compressor, and it is therefore necessary to insert a heat exchanger for cooling down the liquid. According to the invention it is proposed to arrange this heat exchanger between the retentate side of the membrane module and the auxiliary or working liquid inlet of the compressor. This has the advantage that the liquid flows to the membrane module with a slightly elevated temperature and the action of the module as a result is more efficient, i.e. selectivity is increased.

Should the impurity load in the auxiliary or working liquid be very high, it may be expedient to arrange a circulation pump between the separator and the membrane module and to feed back a portion of the retentate stream of the membrane module into the separator via a bypass. Mixing of the cleaned liquid with the liquid having a higher impurity load has the effect of reducing somewhat, in the separator, the total impurity load of the liquid which is then fed to the membrane module. The separation effect is thus significantly increased by this partial recirculation, and the impurity concentration of the working liquid passed to the pump is correspondingly reduced.

In order to increase the selectivity of the pervaporation membrane module it may also be expedient to provide a further heat exchanger between the separator and the module for the purpose of heating the auxiliary or working liquid. In this heat exchanger the liquid, prior to entering the membrane module, is first raised in temperature.

BRIEF DESCRIPTION OF THE DRAWINGS

The invention is explained by way of example with reference to the appended drawings, in which.

DESCRIPTION OF PREFERRED EMBODIMENTS

Figure 1:
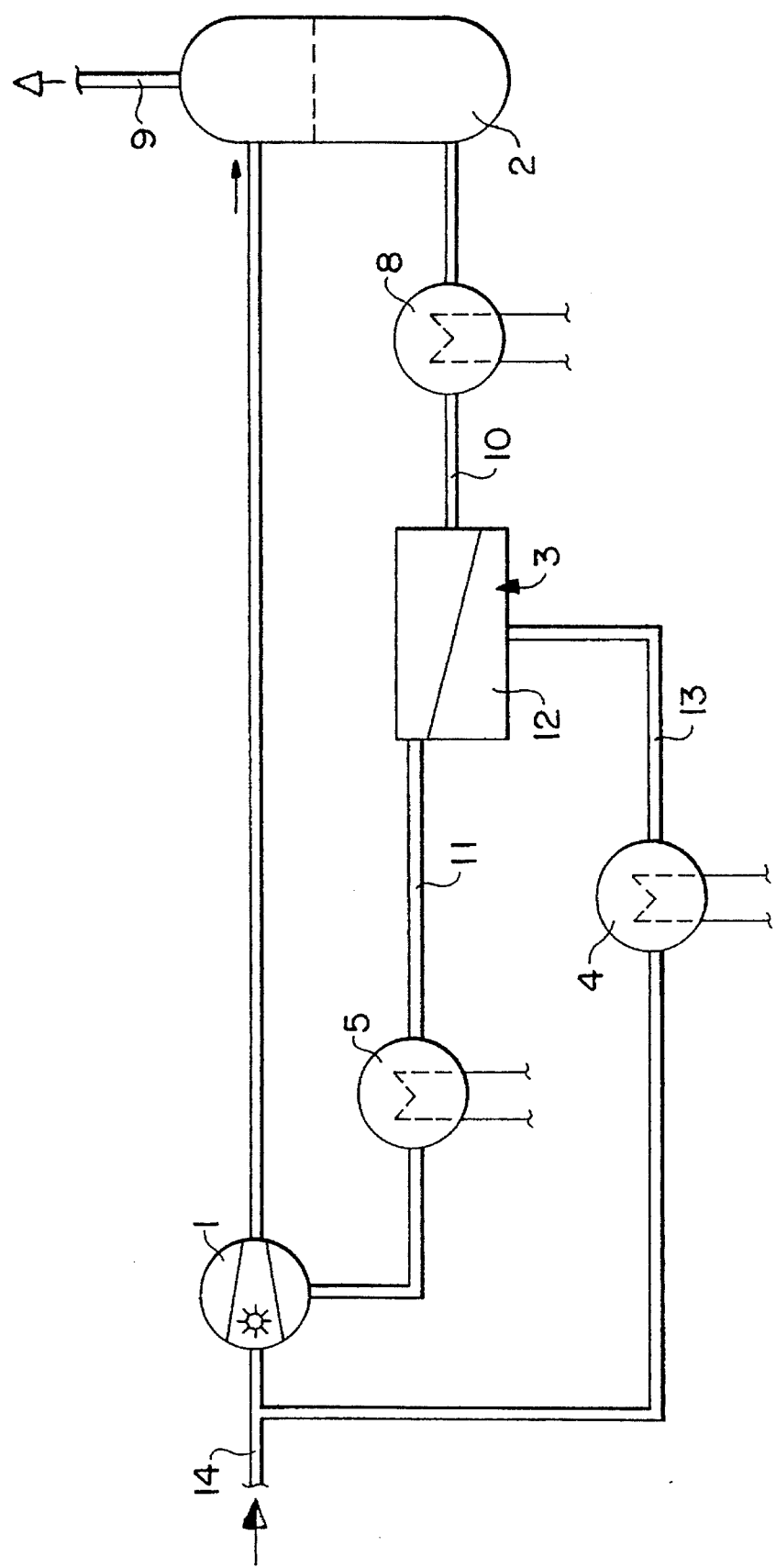
FIG. 1 shows a first embodiment.

FIG. 1 shows a schematic and a flow diagram of a system which contains a process compressor 1 which may, for example, be a liquid-ring gas pump. The gas-liquid mixture leaving the compressor flows into the separator 2, where the gas and the entrained auxiliary or working liquid of the pump are separated. The liquid collects in the bottom part of the separator 2 and is laden with undesirable impurities. The gas is taken from the separator 2 and through the line 9 is delivered to its intended use.

The auxiliary or working liquid is fed via a line 10 to the pervaporation module 3 whose largely cleaned retentate flows through the line 11 as the working liquid directly into the compressor. The line 11 may contain a heat exchanger 5 which serves to cool down the auxiliary or working liquid for process-engineering or operational reasons, for example to reduce the vapor pressure.

Provided in the line 10 between the separator 2 and the membrane module 3 there may further be a heat exchanger 8 through which the liquid flows prior to entering the membrane module. Here, the liquid is heated to enhance the effect of the pervaporation membrane module.

From the permeate side 12 of the module, the vaporous permeate, which is heavily laden with the undesirable impurities, passes through the line 13 into the condenser 4, where the undesirable impurities are precipitated and may then be drawn off in concentrated form from the condenser. The cleaned permeate then flows on into the suction line 14 of the compressor 1 and thus re-enters the circuit.

The liquid is forced through the membrane module and the lines 10 and 11, and the permeate stream is forced through the membrane, through the line 12 and the condenser, by employing the differential pressure of the compressor which also serves as the process compressor. It may be necessary to provide the compressor with a somewhat higher design capacity than would be required solely for the process, but this saves a separate compressor system for the cleaning process.

If the process requires it, it is possible to employ, instead of the one process compressor 1 shown in the example, a plurality of process compressors connected in parallel or in series, just as it is possible to have one or more pervaporation modules connected in series or in parallel.

Figure 2:
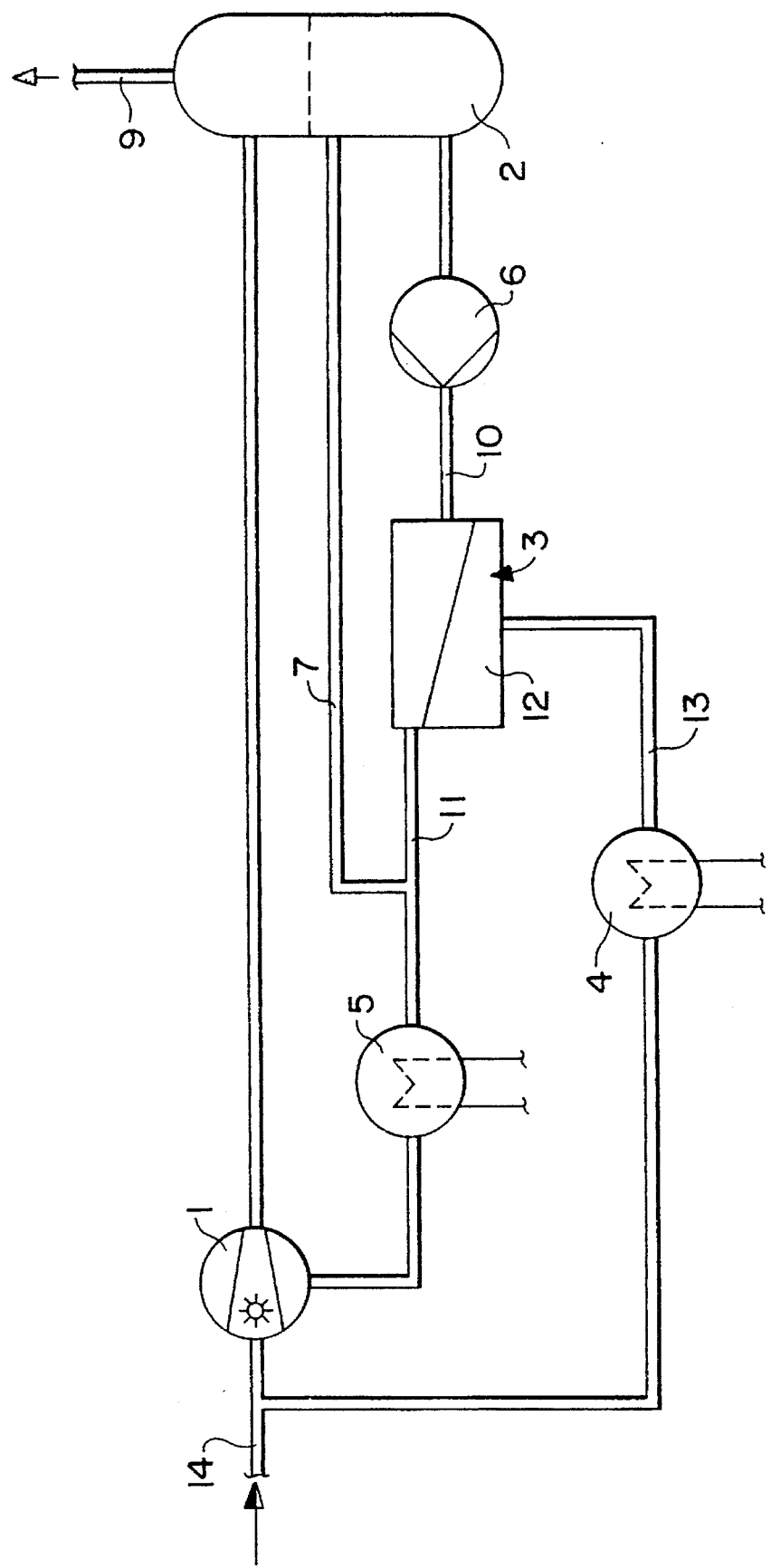
FIG. 2 shows a second embodiment.

FIG. 2 shows the schematic of a system in which corresponding system components are given the same reference numerals as in FIG. 1. This second embodiment differs from the first by there being provided, in addition, a liquid pump 6 in line 10, and a bypass 7 which shunts off a portion of the retentate from the working-liquid line to the compressor and feeds it back to the separator vessel. As a result, only a fraction of the retentate which has passed through the membrane module 3 is fed back into the compressor, while another fraction is subjected to multiple cleaning.

This may be necessary if in the course of once-through flow through the module it is not possible to remove a sufficient amount of impurities from the auxiliary or working liquid of the pump. By mixing retentate already largely freed of impurities with the more highly laden retentate in the vessel 2 and thus reducing the concentration at this point, a reduction in the impurity load is achieved even in the separator. Instead of the retentate being fed back via the line 7 to the separator, it may also be fed to one or more further, special membrane module(s).

We claim:

1. A compressor system having a compressor operated with a working liquid and a device for continuous cleaning of the working liquid containing impurities therein, said compressor having a working liquid inlet, a suction side and a discharge side, said device comprising a separator for receiving the working liquid from the discharge side of the compressor for separating gaseous impurities therein, a pervaporation membrane module having a means for feeding liquid from said separator, retentate side connected to the liquid inlet of said compressor for supplying clean retentate to said compressor and a permeate side containing gaseous impurities connected to the suction side of said compressor and a condenser interposed between the permeate side of the module and the suction side of said compressor for removing a substantial portion of the gaseous impurities within the permeate.

2. The compressor system as claimed in claim 1, wherein a heat exchanger for cooling the retentate is provided between the retentate side of the membrane module and the working liquid inlet of the compressor.

3. The compressor system as claimed in claim 1, wherein a pump is provided between the separator and the membrane module, and a bypass is provided between the retentate side of the module and the separator to permit flow of a fraction of the retentate stream of the membrane module back into the separator.

4. The compressor system as claimed in claim 1, wherein, a heat exchanger is provided, for heating the liquid being fed from the separator.

\* \* \* \* \*